Figure 1:
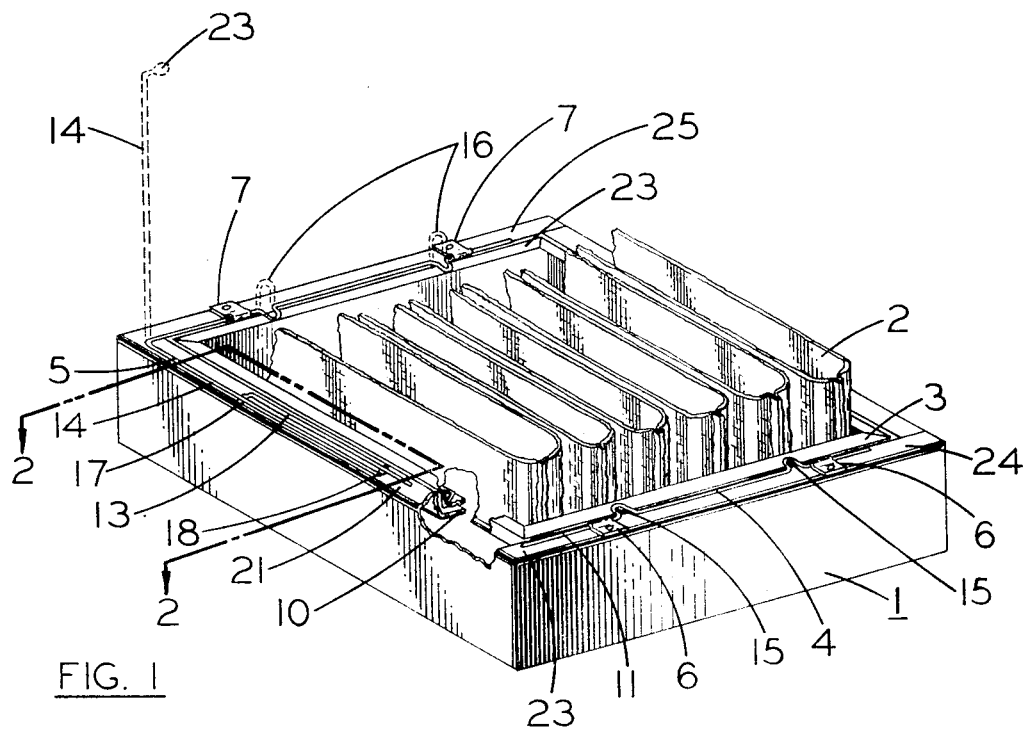

United States Patent [19]
Young

[11] 3,733,793
[45] May 22, 1973

[54] FILTER LATCH
[75] Inventor: George W. Young, Fern Creek, Ky.
[73] Assignee: American Air Filter Company, Inc., Louisville, Ky.
[22] Filed: Oct. 22, 1971
[21] Appl. No.: 191,862

[52] U.S. Cl. .................55/493, 55/500, 55/509, 292/54
[51] Int. Cl. ..............................B01d 27/08
[58] Field of Search.....................55/490, 493, 500, 55/509; 292/256, 256.75, 259, 218, 54

[56] References Cited

UNITED STATES PATENTS

| | | | |
|---|---|---|---|
| 1,114,510 | 10/1914 | Owens | 292/259 |
| 2,502,560 | 4/1950 | Dahlman | 55/483 |
| 3,093,401 | 6/1963 | Hagendoorn | 55/493 |
| 3,698,161 | 10/1972 | Brixius et al. | 55/493 |

Primary Examiner—Bernard Nozick
Attorney—Ralph B. Brick, Charles G. Lamb & Robert W. Fletcher

[57] ABSTRACT

A filter latch including a pair of opposed latch members pivotally mounted to a flow-through housing, the latch members being adaptable for being received by a filter unit wherein base portions of the latch members are pivotally connected to the housing and an arm portion of each latch member is adaptable for engagement with an opposing arm portion of the opposing latch member, the base portions of the latch members including inwardly extending tabs adaptable for engagement with the filter unit, the arm portions of the latch members being pivotable in interlocking coextensive side by side relation.

5 Claims, 2 Drawing Figures

PATENTED MAY 22 1973

3,733,793

FILTER LATCH

BACKGROUND OF THE INVENTION

This invention relates to air filters and more particularly relates to a filter latch for latching a replacable cartridge type filter in a flow-through housing.

In air filtration systems which are installed in office buildings, industrial plants, and the like, replacable panel type filters have been utilized. These filters are generally supported in rectangular flanged frames in a housing or air duct. These filter units become clogged during operation and from time to time are replaced. And, since these filters are periodically replaced, latch means are necessary for latching or holding these filters in alignment with the flow in the housing air duct. Many different latch means have been tried but none have been found to be inexpensive, sturdy, easy and quickly operable, and yet effective in operation.

SUMMARY OF THE INVENTION

In the present invention, it is recognized that it is desirable to provide a filter latch which is inexpensive but yet sturdy in present air filtering systems. Furthermore, it is recognized that it is desirable to provide a filter latch which is easily constructed, and easy and quickly operable. Also, it is recognized that it is desirable to provide an improved filter latch for use with filters of the replacable cartridge type.

The present invention advantageously provides a straight forward arrangement for a filter latch which may be utilized with filters of the replacable cartridge type. The present invention further provides a filter latch which is inexpensive, sturdy, easy and quickly operable, and yet effective during operating conditions.

Various other features of the present invention will become obvious to those skilled in the art upon reading the disclosure set forth hereinafter.

More particularly, the present invention provides a filter apparatus comprising a filter cell support housing having a flow-through aperture disposed therein; a media retaining filter cell flow-through frame having flow-through filter media disposed therein, the frame facingly engaging against the support housing along the periphery of the flow-through aperture; and latch means for the filter cell frame, the latch means including a pair of opposed latch members having base portions pivotally mounted along the support housing on opposite sides of the aperture, the base portions having tab members extending inwardly to engage the filter cell frame; the latch means having arm portions extending from the base portions to be pivoted in coextensive side by side relation, the arm portions including interlock tabs for holding the arm portions in interlocking relation.

Figure 2:
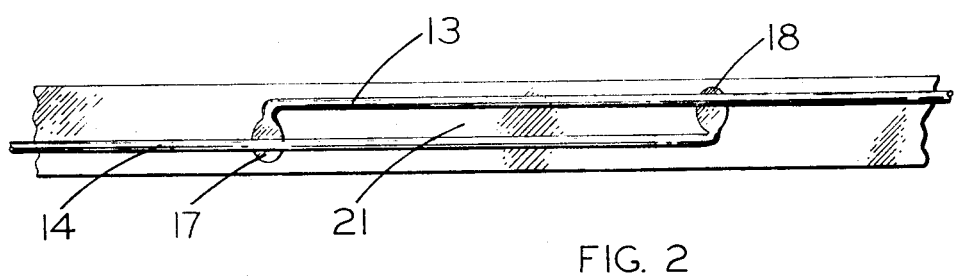

It is to be understood that the description of the examples of the present invention given hereinafter are not by way of limitation and various modifications within the scope of the present invention will occur to those skilled in the art upon reading the disclosure set forth hereinafter:

Referring to the drawings:

FIG. 1 is a perspective view, partially cutaway, of a filter apparatus of the present invention in latching position with phantom lines indicating one latch member in non-lathing position; and FIG. 2 is an enlarged cross-sectioned view, partially cutaway, taken in a plane passing through line 2—2 of FIG. 1.

FIG. 1 of the drawing illustrates a structure of a filter apparatus of the present invention. The filter apparatus of the present invention includes support housing 1 having a flow-through aperture (not shown) therein and filter media 2, the media 2 being fixedly attached to filter frame 3. Filter frame 3 is adapted for facing engagement with a recessed ledge 10 on housing 1 extending along the periphery of the flow through aperture wherein the filter frame 3 is held in place in support housing 1 by latch means.

One latch means of the present invention includes L-shaped latch members 4 and 5 pivotally attached to housing 1 by mounting means, such as, brackets 6 and 7, brackets 6 and 7 being fixedly attached to the opposing top ends 24 and 25, respectively, of filter housing 1. The L-shaped latch member 4 includes a base portion 11 and an arm portion 13. The base portion 11 includes a plurality of inwardly extending tabs or loops 15, only two being shown, which are adaptable for communicating with the outer periphery of the filter frame 3. Loops 15 are advantageously placed adjacent to the bracket 6 to prevent sidewardly movement of the base portion 11. The adjacent position of the loops 15 in the drawing show the loops to be between the brackets 6, but it is realized that the loops could be just as advantageously placed on the opposite side and adjacent to the bracket 6. The opposing L-shaped latch member 5 has corresponding loops 16 positioned in the same relationship with bracket 7 as loops 15 are with bracket 6.

The L-shaped latch member 4 further includes arm portion 13, arm portion 13 having at its extremity an outwardly extending tab 17. L-shaped latch member 5 also includes an arm portion as designated by numeral 14, arm portion 14 having an inwardly extending interlock tab 18 at its extremity. In interlocking or latching position, as illustrated in FIG. 2, interlock tab 18 is adaptable for nesting or underlying the arm portion 13 and interlocking tab 17 is adapted for nesting or underlying arm portion 14. It is realized that the interlocking tabs 17 and 18 may be advantageously adapted for overlying the opposite arm member as well as underlying as illustrated.

In FIGS. 1 and 2 the arm portions 13 and 14 are interlocked on the top side 21 of filter housing 1. It is realized that it may be advantageous to have the interlocking means adaptable for interlocking on the filter frame instead of the housing as illustrated. Further, tabs 17 and 18 are generally flat, but they may be round or of some other geometric configuration and adapted to cooperate with the geometric configuration of the opposing arm portion.

In the construction of the latch members 4 and 5, a metal rod, such as cold rolled steel, has generally sufficient strength and resilience so as to have good rigidity and yet provide for the interlocking to be done with ease.

In the operation of the latch means of the present invention the filter media 2 fixedly attached to filter frame 3 and adapted for facingly engaging against housing 1 is seated within housing 1 on recess ledge 10. The arm portions 13 and 14 are then pulled away from each other a sufficient distance whereby interlock tabs 17 and 18 are placed in underlying relation with their opposing arm portion. When this is complete, the latch means will hold the filter frame securely by the inwardly extending loops 15 and 16 engaging the faces of the opposing sides of filter frame 3.

It will be realized that various changes may be made to specific embodiments shown and described without departing from the principles of the present invention.

What is claimed is:

1. A filter apparatus comprising a filter cell support housing having a flow-through aperture disposed therein; a media retaining filter cell flow-through frame having flow-through filter media disposed therein, said frame facingly engaging against said support housing along the periphery of said flow-through aperture; and latch means for said filter cell frame, said latch means comprising a pair of opposed latch members having base portions pivotally mounted along said support housing on opposite sides of said aperture, said base portions having tab members extending inwardly to engage said filter cell frame; said latch means having arm portions extending from said base portions pivoted in coextensive side by side relation, said arm portions including interlock tabs holding said arm portions in interlocking relation.

2. The filter apparatus of claim 1, said base portions of said latch members having two pivotal mounting means for each base portion, and said inwardly extending tab members of said base portions being between and adjacent to said mounting means whereby sidewardly movement of said base portions is prevented.

3. The filter apparatus of claim 1, said latch members being L-shaped.

4. The filter apparatus of claim 1, said interlock tabs being inwardly extending on one arm portion and outwardly extending on the opposite arm portion.

5. The filter apparatus of claim 1, said interlock tabs being adapted to underlie their opposing arm portions.

* * * * *